United States Patent [19]

Rappazzo

[11] Patent Number: 4,575,205

[45] Date of Patent: Mar. 11, 1986

[54] SELF-ADHERENT CORNEAL CONTACT LENS

[76] Inventor: J. Alan Rappazzo, 501 W. Ray Rd., Ste. 7, Chandler, Ariz. 85224

[21] Appl. No.: 660,641

[22] Filed: Oct. 15, 1984

[51] Int. Cl.$^4$ .......................... A61B 3/10; G02C 7/04
[52] U.S. Cl. .................................. 351/219; 351/160 R
[58] Field of Search .................... 351/160 R, 162, 219

[56] References Cited

U.S. PATENT DOCUMENTS

| | | | |
|---|---|---|---|
| 4,067,646 | 1/1978 | Nohda | 351/219 |
| 4,410,245 | 10/1983 | Koester | 351/219 |
| 4,439,026 | 3/1984 | Wilms | 351/219 |

Primary Examiner—John K. Corbin
Assistant Examiner—Scott J. Sugarman
Attorney, Agent, or Firm—Senniger, Powers, Leavitt and Roedel

[57] ABSTRACT

A self-adherent corneal contact lens which is placed on the cornea of an eye for viewing the interior of the eye, as during clinical diagnoses of the eye and eye surgery. The lens has a central optical zone for viewing the posterior chamber of the eye, a curve peripheral flange for viewing the periphery of the posterior chamber, the flange terminating in an edge having a non-optical bevel engageable with the cornea of the eye for holding the lens in substantially stationary position on the eye. The central optical zone has a negative diopter power and the curved peripheral flange has a positive diopter power.

16 Claims, 4 Drawing Figures

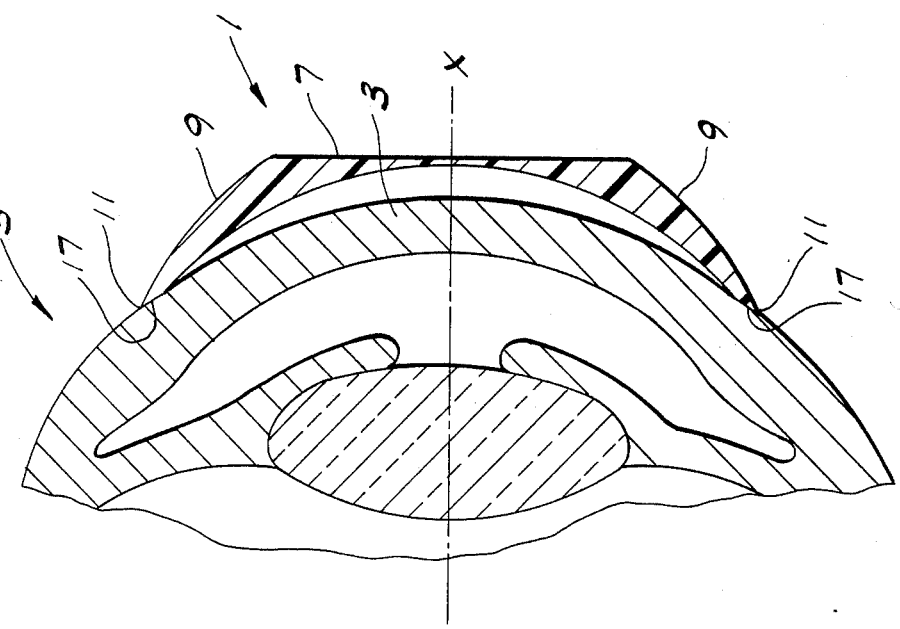
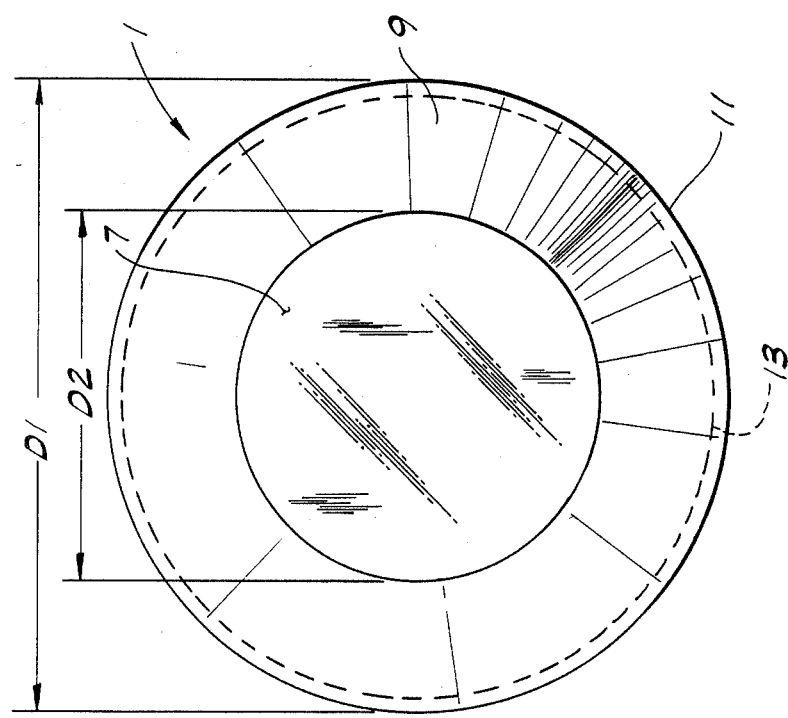

SELF-ADHERENT CORNEAL CONTACT LENS

BACKGROUND OF THE INVENTION

This invention relates generally to a corneal contact lens and, more particularly to a self-adherent corneal contact lens which is placed on the cornea of an eye for viewing the interior of the eye, as during clinical diagnosis of the eye and eye surgery.

Eye surgery, such as closed pars plana vitrectomy, requires a corneal contact lens and operating microscope to visualize structures of the posterior segment. In order to maintain a clear view of the posterior segment, a corneal contact lens must neutralize the refractive power of the cornea to permit a satisfactory view of vitreo-retinal pathology. In addition, the lens should be able to permit constant contact with the cornea despite rotation of the globe, minimize the accumulation of blood or air bubbles between the posterior surface of the contact lens and the corneal anterior surface, minimize corneal epithelial edema or injury, and not interfere with any of the instumentation used during surgery. Current surgical contact lens require either specific optical, anchoring or irrigating modes which oftentimes cause injury to the eye. Moreover, such contact lenses normally necessitate the assistance of a skilled individual to maintain the lens in place. Another problem is that such lenses are susceptible to scratching of the lens surface, thereby causing a problem with optical impairment. Since current lenses are relatively expensive this results in an increased cost to a patient.

SUMMARY OF THE INVENTION

Among the several objects of this invention may be noted the provision of a corneal contact lens which is self-adherent and thus eliminates the need for an assistant; the provision of such a lens which minimizes damage to the eye during surgery; the provision of a lens which promotes optical clarity by minimizing the deleterious effects of anoxia and irrigation of the cornea; and the provision of such a lens which is inexpensive to manufacture and disposable, thereby eliminating the problem of optical impairment from scratching due to prior use.

In general, a self-adherent corneal contact lens of this invention has a central optical zone for viewing the posterior chamber or segment of the eye, a curved peripheral flange for viewing the periphery of the posterior chamber or segment, the flange terminating in an edge having a non-optical bevel engageable with the cornea of the eye for holding the lens in substantially stationary position on the eye. The central optical zone has a negative diopter power and the curved peripheral flange has a positive diopter power.

Other objects and features will be in part apparent and in part pointed out hereinafter.

BRIEF DESCRIPTION OF THE DRAWINGS

FIG. 1 is a top view of a lens of this invention;
FIG. 3 shows in cross-section the lens of the present invention positioned on the cornea of an eye.

Corresponding reference characters indicate corresponding parts throughout the several views of the drawings.

DESCRIPTION OF THE PREFERRED EMBODIMENT

Figure 2:
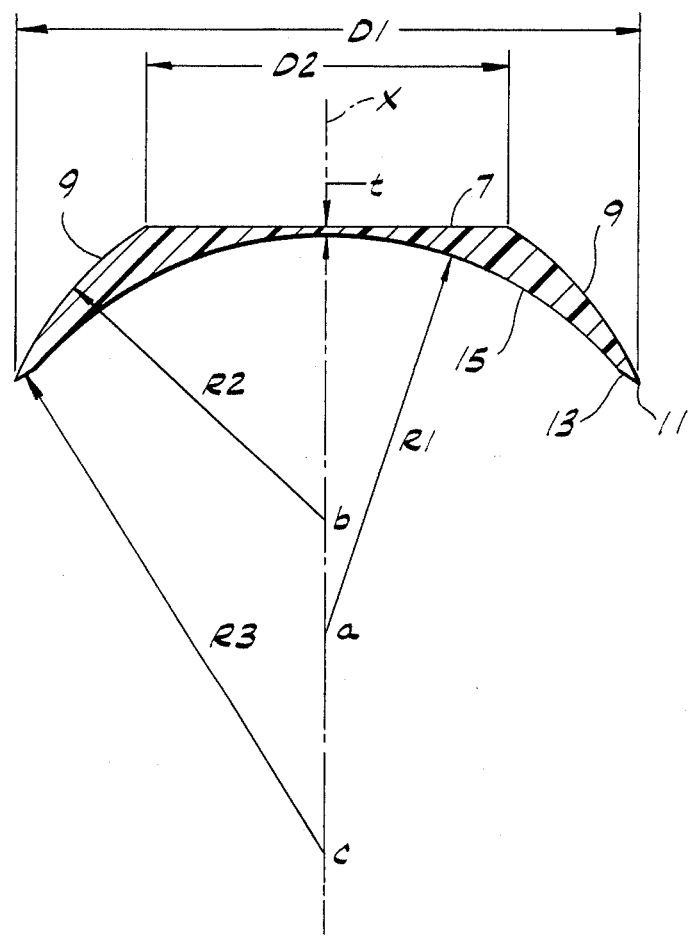
FIG. 2 is a vertical section of the lens of FIG. 1.

Referring to the drawings, a self-adherent corneal contact lens of this invention is generally designated 1. The lens is designed to be placed on the cornea 3 of an eye 5 for viewing the interior of the eye, as during clinical diagnosis of the eye and eye surgery, and has a central optical zone 7 for viewing the posterior chamber or segment of the eye and a curved peripheral flange 9 for viewing the periphery of the posterior chamber or segment. The flange terminates in an edge 11 having a non-optical bevel 13 engageable with the cornea of the eye for holding the lens in substantially stationary position on the eye. The central optical zone 7 has a negative diopter power and the curved peripheral flange 9 has a positive diopter power, thus providing a central panoramic view and a peripheral magnified view.

More particularly, the lens 1 of this invention is generally lightweight and made of a suitable transparent substance, such as a gas-permeable silicone/acrylate polymer. The lens is generally circular in shape as viewed from the top (see FIG. 1), and has a diameter $D_1$ in the range of 6.0–12.5 mm. The lens is preferably about 10.2 mm in diameter. The lens has a relatively steep, generally concave posterior or inside surface 15 having a radius of curvature $R_1$, referred to as the central posterior curve, in the range of 5.0 mm to 9.0 mm, the preferred radius of curvature being about 6.50 mm. As shown in FIG. 2, the lens has an optical centerline x which passes generally through the center of the lens and generally at right angles to the posterior and anterior surfaces of the lens. The radius of curvature $R_1$ of the central posterior curve is centered at a on centerline x and is located about 6.50 mm from the inside surface 15. The relatively sharp curvature of the posterior curve permits the lens to be lighter in weight and firmly adhere to the cornea with a suction action, thereby enhancing the capability of the lens to remain in the desired location. This capability is particularly advantageous since lenses which require sutures to hold them in place may cause perilimbal hemorrhage which can compromise the intraoperative view and any lens which is firmly anchored to the cornea by such a method precludes observation of the extreme retinal periphery. On the other hand, a lens which is stabilized by a handle angulated so that it may be held out of view by an assistant may restrict free movement of the eye during crucial moments of the surgery and is dependent upon the attentiveness of the assistant. Furthermore, excessive pressure by the assistant may increase the intraocular pressure to dangerous levels and reduce optical clarity by wrinkling the corneal stroma and Descemet's membrane.

Figure 4:
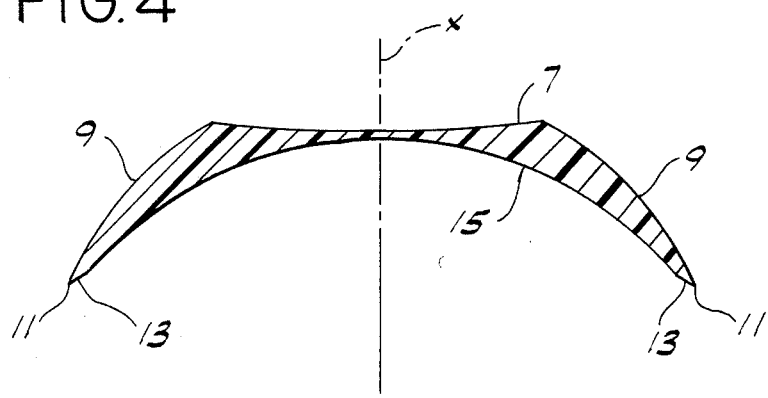
FIG. 4 is a view illustrating a second embodiment of the invention.

The central optical zone 5, like the lens 1, is generally circular in shape and is located generally in the center of the lens. The central optical zone has a diameter $D_2$ in the range of 2.0–10 mm, and is preferably about 6.0 mm. The central optical zone has a diopter power in the range of $-50.0$ to $-100.0$ power. The upper or anterior surface of the central optical zone may be either plano (FIGS. 2 and 3) or concave (FIG. 4) thereby making the lens either plano-concave or concave-concave, the posterior of the lens being concave. When the lens is plano-concave, the diopter power is preferably about $-75.384$, but when the lens is convex-concave, the diopter power is preferably about $-93.0$. The central optical zone has a thickness t at its center in the range of 0.05–0.30 mm, and is preferably about 0.10 mm.

The peripheral flange 9 of the lens has a generally convex outer surface having a radius of curvature R2 less than the radius of curvature R1 of the central posterior curve. Preferably, the radius R2 of curvature of the peripheral flange is about 5.62 mm, and, as shown in FIG. 2, is centered at b on the optical centerline x approximately 4.65 mm from concave surface 15 along the centerline. The peripheral flange further has a diopter power in the range of 0 to +15.0 power, and is preferably about +12.0.

The bevel 13 of the lens is generally contoured so as to generally conform to the curvature of the cornea of the eye, having a radius of curvature R3 greater than the radius of curvature R1, preferably about 9.25 mm, and, as shown in FIG. 2, is centered at c on the optical centerline x approximately 10.1 mm from concave surface 15 along the centerline. The width of the bevel is relatively small, approximately 0.2 mm, thereby minimizing the tendency of the lens to slide on the cornea. When the lens is positioned on the cornea the bevel is generally at the limbus 17 of the eye.

As noted previously, the lens is perferably composed of a gas permeable plastic to minimize corneal anoxia and promote the integrity of the epithelial surface. Moreover, by not requiring irrigation, epithelial damage and corneal edema are kept to a minimum. As understood by those familiar in the art, corneal integrity is particularly important in multihour procedures to allow visualization, and because the maintenance of an intact epithelial surface promotes more rapid return of vision and less discomfort in the post-operative period.

Furthermore, since the lens of this invention is preferably composed of inexpensive material, it permits the lens to be disposable thereby allowing the greatest optical clarity by preventing damage from prior use.

It will be understood from the above that the lens of this invention promotes optical clarity and minimizes the deleterious effects of anoxia and irrigation on the cornea. Moreover, by its firm adherence to the corneal surface, bubbles and blood are less likely to enter into the viscous interface. The use of a polymer to make the lens permits it to be lightweight, inexpensive and disposable thus eliminating optical impairment from scratching due to prior use.

It will be further understood that in addition to surgery and clinical diagnosis, the lens could be employed during laser photocoagulation thereof and may be adapted for use on animals.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A self-adherent corneal contact lens adapted to be placed on the cornea of an eye for viewing the interior of the eye, as during clinical diagnosis of the eye and eye surgery, said lens having a central optical zone for viewing the posterior chamber or segment of the eye, a curved peripheral flange for viewing the periphery of the posterior chamber or segment, said flange terminating in an edge having a non-optical bevel engageable with the cornea of the eye, said lens further having a generally concave inside surface having a radius of curvature, constituting the central posterior curve, less than that of the cornea of the eye for creating a suction effect when the lens is placed on the cornea with said non-optical bevel engaging the cornea of the eye thereby to hold the lens in a substantially stationary self-adherent position on the cornea, said central optical zone having a negative diopter power and said curved peripheral flange having a positive diopter power.

2. A self-adherent corneal contact lens as set forth in claim 1 wherein said central posterior curve has a radius of curvature, in the range of 5.0 mm to 9.0 mm.

3. A self-adherent corneal contact lens as set forth in claim 2 wherein said peripheral flange has a generally convex outer surface having a radius of curvature less than the radius of curvature of the central posterior curve.

4. A self-adherent corneal contact lens as set forth in claim 3 wherein the bevel is shaped so as to generally conform to the curvature of the eye.

5. A self-adherent corneal contact lens as set forth in claim 4 wherein the diameter of the central optical zone is in the range of 2.0–10 mm and the diameter of the lens is in the range of 6.0–12.5 mm.

6. A self-adherent corneal contact lens as set forth in claim 5 wherein the central optical zone has a thickness at its center in the range of 0.05–0.30 mm.

7. A self-adherent corneal contact lens as set forth in claim 6 wherein said lens has an optical centerline passing generally through the center of the lens and generally at right angles to the posterior and anterior surfaces of the lens, said central posterior curve having a radius of curvature centered on said optical centerline of approximately 6.50 mm.

8. A self-adherent corneal contact lens as set forth in claim 7 wherein said peripheral flange has a radius of curvature centered on said optical centerline of approximately 5.62 mm.

9. A self-adherent corneal contact lens as set forth in claim 8 wherein said central optical zone has a thickness at its center of approximately 0.10 mm.

10. A self-adherent corneal contact lens as set forth in claim 9 wherein the diameter of the central optical zone is approximately 6.0 mm.

11. A self-adherent corneal contact lens as set forth in claim 10 wherein the diameter of the lens is approximately 10.2 mm.

12. A self-adherent corneal contact lens as set forth in claim 11 wherein said bevel has a width of approximately 0.2 mm.

13. A self-adherent corneal contact lens as set forth in claim 12 wherein said bevel has a radius of curvature centered on said optical centerline of approximately 9.25 mm.

14. A self-adherent corneal contact lens as set forth in claim 1 wherein said lens is plano-concave, the anterior optical zone being plano and the posterior of the lens being concave.

15. A self-adherent corneal contact lens as set forth in claim 1 wherein said lens is concave-concave, the anterior optical zone being concave and the posterior of the lens being concave.

16. A self-adherent corneal contact lens as set forth in claim 1 wherein the lens is formed from a gas permeable silicone/acrylate polymer.

* * * * *